United States Patent
Go et al.

(10) Patent No.: US 9,645,005 B2
(45) Date of Patent: May 9, 2017

(54) LIQUID LEVEL DETECTOR

(71) Applicant: Aisan Kogyo Kabushiki Kaisha, Obu-shi (JP)

(72) Inventors: Masashi Go, Chita-gun (JP); Nobuo Suzuki, Obu (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 105 days.

(21) Appl. No.: 14/694,418

(22) Filed: Apr. 23, 2015

(65) Prior Publication Data

US 2015/0308880 A1 Oct. 29, 2015

(30) Foreign Application Priority Data

Apr. 25, 2014 (JP) ................................. 2014-091032

(51) Int. Cl.
*G01F 23/38* (2006.01)

(52) U.S. Cl.
CPC .................................... *G01F 23/38* (2013.01)

(58) Field of Classification Search
CPC ............. G01F 23/38; F16B 2/22; F16B 17/00
See application file for complete search history.

(56) References Cited

U.S. PATENT DOCUMENTS

| | | | |
|---|---|---|---|
| 4,987,400 A | * | 1/1991 | Fekete ..................... G01F 23/36 257/E43.004 |
| 2009/0038395 A1 | * | 2/2009 | Roth ...................... G01F 23/366 73/313 |
| 2015/0000398 A1 | * | 1/2015 | Ogasawara ............. G01F 23/38 73/322.5 |

FOREIGN PATENT DOCUMENTS

| | | | | |
|---|---|---|---|---|
| JP | 2006-226843 A | | 8/2006 | |
| JP | 2009-244016 A | | 10/2009 | |
| JP | 2012154691 A | * | 8/2012 | ........... G01F 23/363 |
| JP | 2013-137256 A | | 7/2013 | |
| JP | 2014-025888 A | | 2/2014 | |
| JP | 2014-071041 A | | 4/2014 | |
| KR | 10-2013-0019081 A | | 2/2013 | |

OTHER PUBLICATIONS

Korean Office Action for Korean Application No. 10-2015-0039903 mailed on Dec. 30, 2015 and corresponding English translation. (8 pages).

* cited by examiner

*Primary Examiner* — Francis Gray (74) *Attorney, Agent, or Firm* — Shumaker, Loop & Kendrick, LLP (57) ABSTRACT

A liquid level detector may include a float; an arm attached to the float and configured to convert a linear motion of the float in an up-and-down direction to a rotary motion; a sensor configured to detect the rotary motion; and a supporting member supporting the arm to be rotatable relative to the sensor. The supporting member may include: a body fixed to the sensor; a holder rotatably attached to the body; and a cover arranged on an opposite side from the body with the holder intervened in between, and covering the holder from the opposite side. The arm may be supported by the supporting member between the holder and the cover.

11 Claims, 9 Drawing Sheets

LIQUID LEVEL DETECTOR

CROSS-REFERENCE TO RELATED APPLICATION

This application claims priority to Japanese Patent Application No. 2014-091032 filed on Apr. 25, 2014, the contents of which are hereby incorporated by reference into the present application.

TECHNICAL FIELD

Disclosed herein are exemplary liquid level detectors configured to detect a level of liquid (for example, a device configured to detect an amount of fuel stored in a fuel tank of an automobile or the like).

DESCRIPTION OF RELATED ART

Japanese Patent Application Publication, No. 2006-226843 A discloses a liquid level detector including: a float configured to move up and down depending on a liquid level; and an arm configured to convert an up-and-down motion of the float to a rotary motion; and a holder supporting the arm. The holder holds the arm with a holding portion, a hook, and a stopper. The holding portion, the hook, and the stopper are all exposed to outside of the liquid level detector.

SUMMARY

In the art described above, there is a possibility that when the liquid level detector is placed into a container, any of the holding portion, the hook, and the stopper, which are exposed to outside, may come into contact with the container. As a result of this, the arm may come off a supporting member supporting the arm.

The present specification provides for restraining an arm from coming off a holder.

This application discloses a liquid level detector. The liquid level detector may comprise: a float; an arm attached to the float and configured to convert a linear motion of the float in an up-and-down direction to a rotary motion; a sensor configured to detect the rotary motion of the arm; and a supporting member supporting the arm to be rotatable relative to the sensor. The supporting member may comprise: a body fixed to the sensor; a holder rotatably attached to the body; and a cover arranged on an opposite side from the body with the holder intervened in between, and covering the holder from the opposite side. The arm may be supported by the supporting member between the holder and the cover.

In the liquid level detector described above, the supporting member supporting the arm is prevented by the holder and the cover from being exposed to outside. As a result, when the liquid level detector is placed into a container, the supporting member may be prevented from making contact with the container. The arm may be restrained from coming off the supporting member.

DETAILED DESCRIPTION

Some features of embodiments described herein will be listed. Notably, technical features described herein are each independent technical elements, and exhibit technical usefulness thereof solely or in combinations.

(Feature 1) In the liquid level detector, the holder and the cover may be connected to each other by a snap fit structure. This configuration makes it possible to easily attach the cover to the holder.

(Feature 2) In the liquid level detector, the arm may extend between the holder and the cover at least in a first direction and a second direction being different from the first direction. At least one of the holder and the cover may contact a portion of the arm extending in the second direction. This configuration makes it possible to restrain the arm from being displaced in the first direction.

(Feature 3) In the liquid level detector, the arm may bend at least at a first bending point and a second bending point between the holder and the cover. The first bending point may be located on a float side from the second bending point. A portion of the arm located on the float side from the first bending point may extend in the first direction. A portion of the arm located on an opposite side of the float side from the first bending point may extend in the second direction. At least one of the holder and the cover may contact a portion of the arm located between the first bending point and the second bending point, and a portion of the arm located on the opposite side of the float side from the second bending point of the arm. This configuration makes it possible to, without causing the arm to branch into a portion extending in the first direction and a portion extending in the second direction, restrain the arm from being displaced in the first direction.

(Feature 4) In the liquid level detector, the arm may bend at a third bending point located between the first bending point and the second bending point. The arm may bend on a rotation plane of the arm at the first bending point, the second bending point, and the third bending point respectively. A portion of the arm located between the first bending point and the third bending point and the portion of the arm located on the opposite side of the float side from the second bending point of the arm may extend in the rotation plane toward the same direction with a space between each other. The holder may be disposed between the portion located between the first bending point and the third bending point of the arm and the portion located on the opposite side of the float from the second bending point of the arm. The holder may contact the portion located between the first bending point and the third bending point of the arm and the portion located on the opposite side of the float from the second bending point of the arm. This configuration makes it possible to, without causing the arm to branch into a portion extending in the first direction and a portion extending in the second direction, restrain the arm from being displaced in the first direction.

(Feature 5) In the liquid level detector, the holder may comprise a regulator configured to regulate the arm to move in a direction orthogonal to the rotation plate of the arm. This configuration makes it possible to restrain the arm from being displaced in a direction orthogonal to a rotation plane of the arm.

(Feature 6) In the liquid level detector, the holder may comprise a hook portion protruding toward outside of the holder. The cover may comprise an engaging portion engaging with the hook portion. In the snap fit structure, the engaging portion may engage with the hook portion while the engaging portion is located on a body side than the hook portion. The body may comprise a rotation regulating portion configured to regulate a rotation of the arm and disposed at an outer peripheral end of the cover with an interval provided between the rotation regulating portion and the outer peripheral end of the cover. The engaging portion and the rotation regulating portion may be disposed with an interval between each other in a state where the hook portion and the rotation regulating portion oppose each other and the engaging portion is engaged with the hook portion. A clearance between the hook portion and the rotation regulating portion may be smaller than a thickness of the hook portion in a state where the hook portion and the rotation regulating portion oppose each other. In this configuration, in a case where the engaging portion is not properly engaging with the hook portion and contacts an end of an outer side of the hook portion, rotation of the holder and the cover following rotation of the arm brings the engaging portion and the rotation regulating portion into contact with each other. This makes it possible to easily find that the engaging portion is not properly engaging with the hook portion.

(Feature 7) The liquid level detector may comprise a magnet retained by the holder and disposed to be rotatable with respect to the sensor. The sensor may detect the rotary motion of the arm by detecting a direction of a magnetic field of the magnet.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved liquid level detectors, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 1:
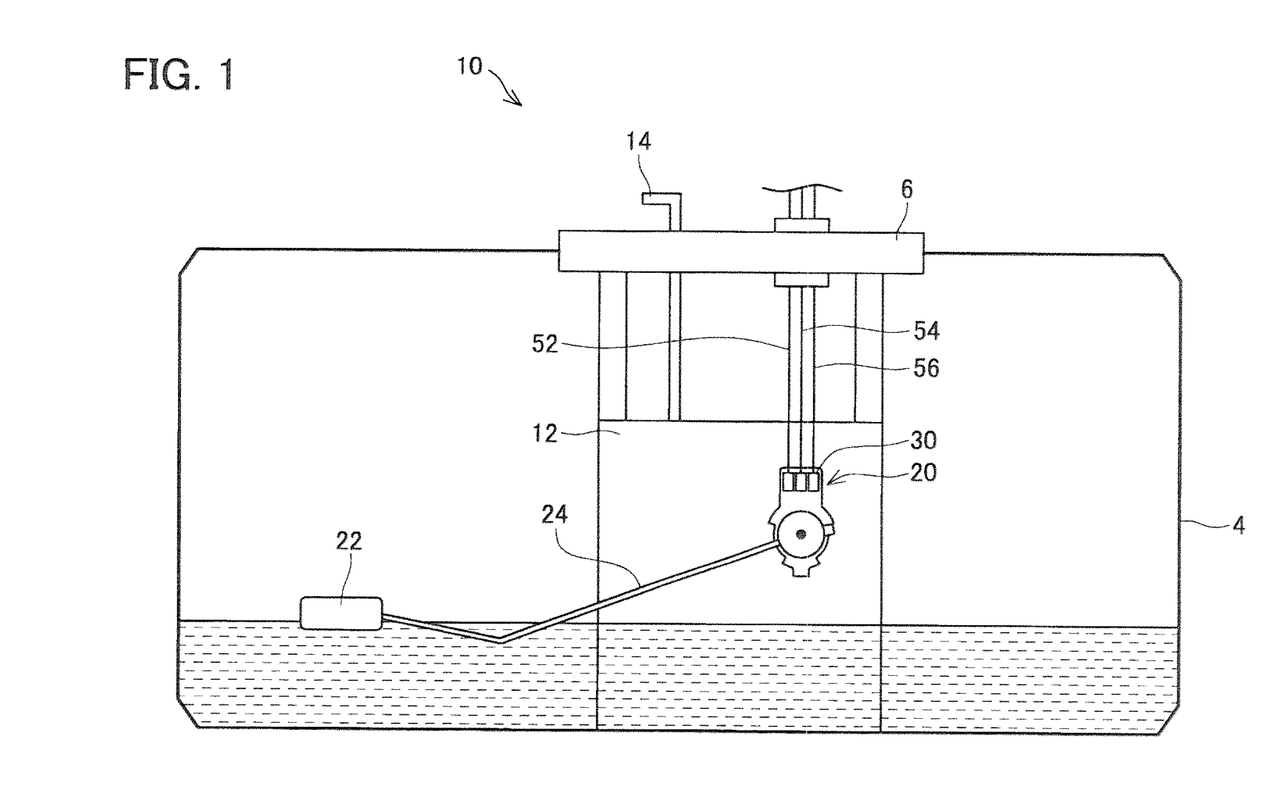
FIG. 1 shows a configuration of a fuel pump module.

As shown in FIG. 1, a fuel pump module 10 is a unit configured to supply, to an engine (not illustrated), fuel in a fuel tank 4 mounted in a vehicle such as an automobile. The fuel pump module 10 is placed in the fuel tank 4.

The fuel pump module 10 includes a fuel pump unit 12 and a fuel amount detector 20. The fuel pump unit 12 is housed in the fuel tank 4. The fuel pump unit 12 is attached to a set plate 6 configured to close an opening in the fuel tank 4. The fuel pump unit 12 sucks in the fuel in the fuel tank 4, pressurizes the fuel thus sucked in, and discharges the fuel. The fuel discharged from the fuel pump unit 12 is supplied to the engine through a discharge port 14.

The fuel amount detector 20 includes a float 22, an arm 24 to which the float 22 is fixed, and a magnetic sensor unit 30 configured to detect a rotation angle of the arm 24. The float 22 floats on the surface of the fuel in the fuel tank 4 and moves up and down depending on the liquid level of the fuel. The float 22 is rotatably attached to a leading end of the arm 24. A base end of the arm 24 is supported to be rotatable with respect to the magnetic sensor unit 30. For this reason, when the float 22 moves up and down depending on the liquid level of the fuel in the fuel tank 4, the arm 24 thereby swingably rotates with respect to the fuel pump unit 12.

The arm 24 is made of a metal, such as stainless steel, that has resistance to the fuel. The arm 24 is made by bending a columnar rod-like member at an intermediate position. The float 22 is attached to the leading end of the arm 24. The base end of the arm 24 is attached to the magnetic sensor unit 30.

Figure 2:
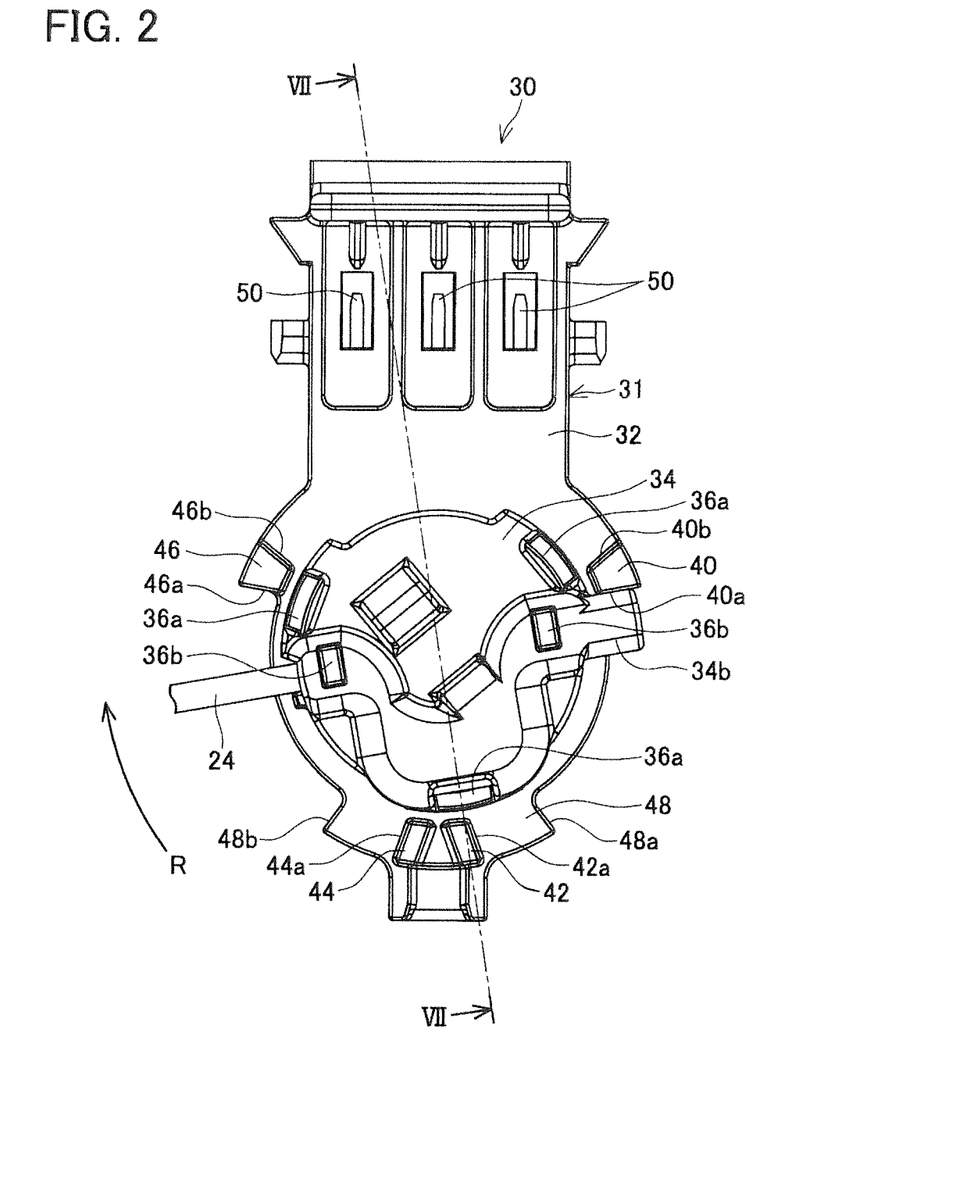
FIG. 2 is a front view of a magnetic sensor unit.
Figure 3:
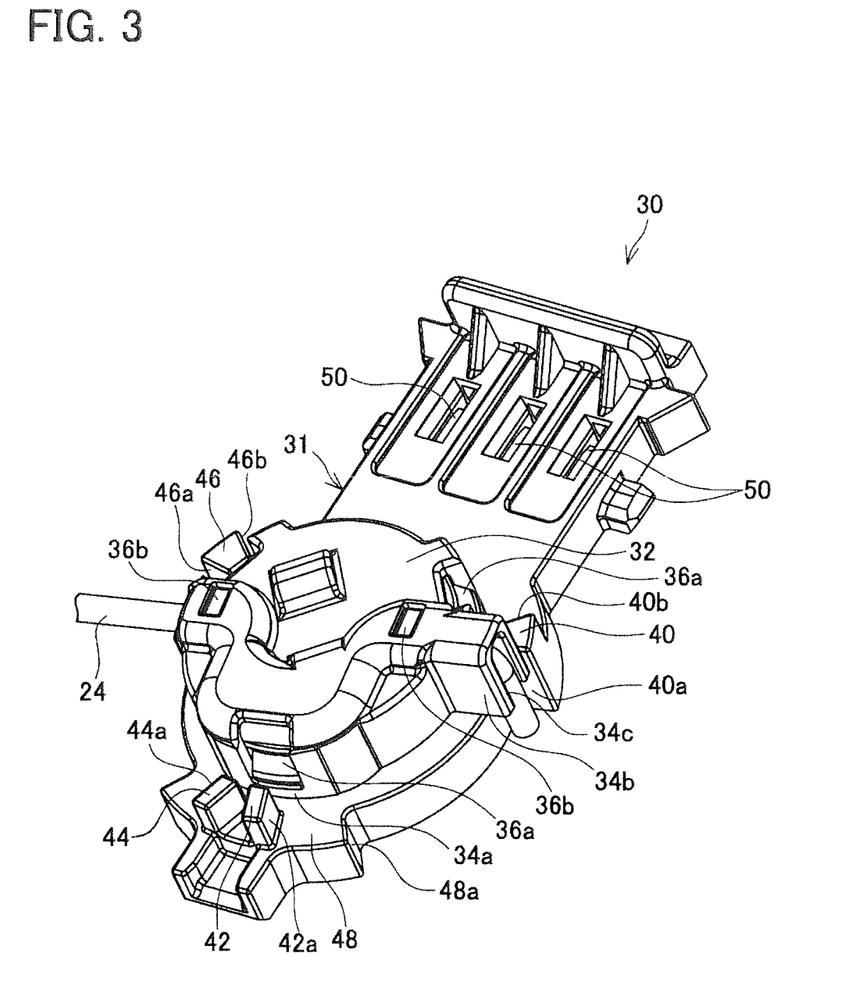
FIG. 3 is a perspective view of the magnetic sensor unit.
Figure 4:
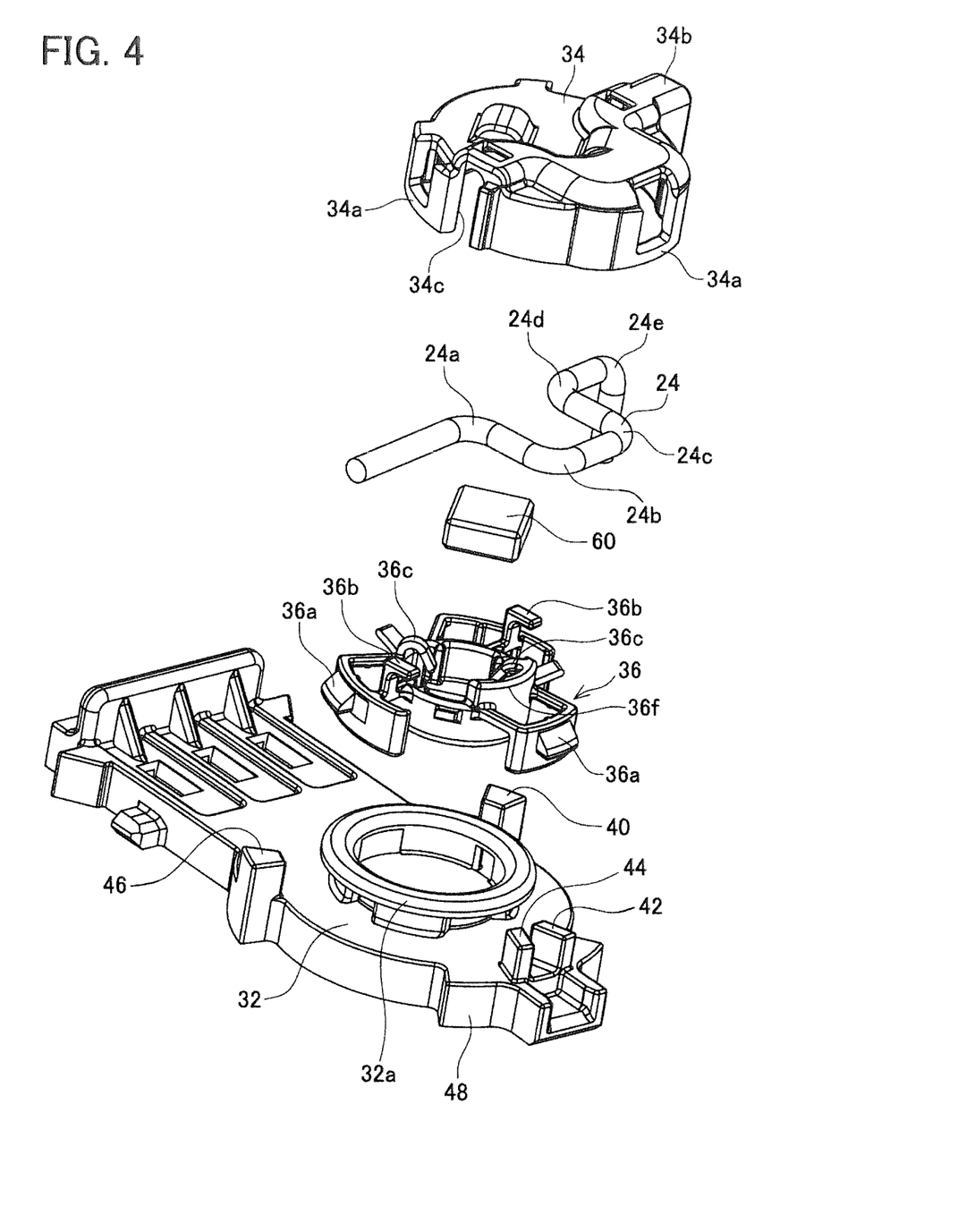
FIG. 4 is an exploded perspective view of the magnetic sensor unit.

As shown in FIG. 4, the arm 24 (FIGS. 2 to 4, 6, and 9 illustrate only a portion of the arm 24 in the vicinity of the magnetic sensor unit 30) bends at right angles at bending points 24a to 24d at which the arm 24 bends parallel to a rotation plane (i.e. a plane parallel to the plane of paper of FIG. 2) of the arm 24, and also at a bending point 24e at which the arm 24 bends in a direction perpendicular to the rotation plane of the arm 24. The arm 24 changes the direction along which it extends, at the bending position 24a from one direction to another direction. The term "rotation plane" herein means a plane including a range of movement within which a central axis of the arm 24 moves when the arm 24 rotates.

As shown in FIGS. 2 and 3, the magnetic sensor unit 30 supports the arm 24 to be rotatable relative to the fuel pump unit 12. The magnetic sensor unit 30 includes a supporting member 31, a magnet 60 (see FIG. 4), a magnetic sensor 52 (see FIG. 7), and lead wires 50.

As shown in FIG. 4, the supporting member 31 includes a body 32, a cover 34, and a holder 36. The body 32 is fixed to an outer wall of the fuel pump unit 12. The body 32 is made of resin (e.g. epoxy resin). The body 32 includes a guide rail 32a and rotation regulating portions 40, 42, 44, 46, and 48.

The guide rail 32a guides the axial rotation of the holder 36. The guide rail 32a protrudes from a surface (i.e. a surface located on a side opposite to the fuel pump unit 12) of the body 32. The guide rail 32a has an annular shape.

As shown in FIG. 2, the rotation regulating portions 40, 42, 44, 46, and 48 regulate the rotation of the arm 24 by contacting a contact portion 34b of the cover 34 or the arm 24. The rotation regulating portions 40, 42, 44, and 46 are disposed in positions distant from an outer periphery of the guide rail 32a. The rotation regulating portions 40, 42, 44, and 46 protrude from a front surface of the body 32. The rotation regulating portion 48 is disposed at a lower end of the body 32. The rotation regulating portion 48 has a partially annular shape having the same center as the center of the annular shape of the guide rail 32a (hereinafter referred to simply as the "center of the guide rail 32a").

Figure 5:
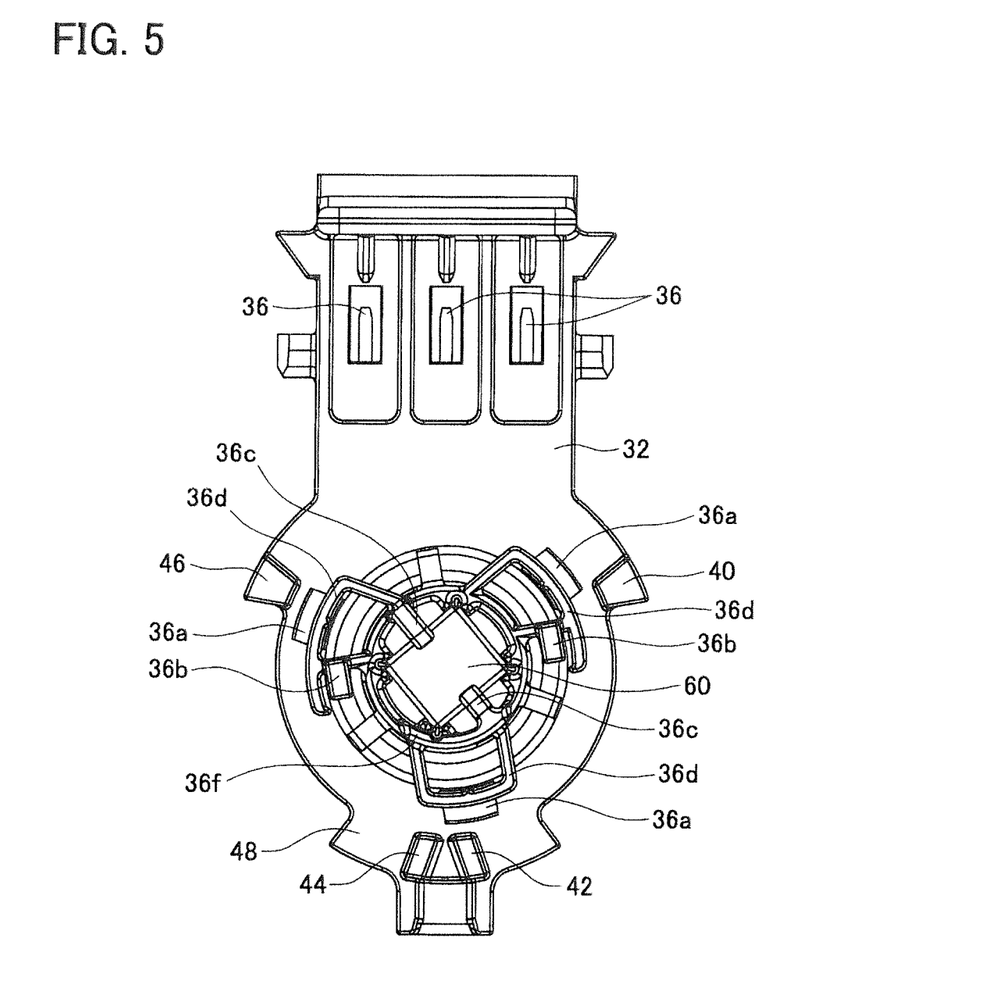
FIG. 5 shows how a holder and a magnet are attached to a body.

As shown in FIG. 5, the holder 36 is axially rotatably attached to the guide rail 32a. The holder 36 includes three engaging portions 36d, two magnet holding portions 36c, two arm holding portions 36b, and a contact wall 36f. The two magnet holding portions 36c face each other across the center of the guide rail 32a. Each of the magnet holding portions 36c protrudes in a direction opposite to the body 32 and has a leading end bending toward the center of the guide rail 32a. The magnet 60 is disposed between the two magnet holding portions 36c, and is held by the holder 36 by the magnet holding portions 36c contacting surfaces of the magnet 60 opposite to the body 32. The holder 36 uses the magnet holding portions 36c to hold the magnet 60 so that the magnet 60 can rotate on the center of the guide rail 32a.

The three engaging portions 36d are placed at intervals from each other along the circumference of the guide rail 32a. Each of the engaging portions 36d extends from an inner peripheral side of the guide rail 32a beyond an outer peripheral end of the guide rail 32a, and extends toward the body 32 on the outer side of the outer peripheral end of the guide rail 32a. On the outer side of the outer peripheral end of the guide rail 32a, hook portions 36a and 36e (see FIG. 7) are provided in the vicinity of a lower end of each of the engaging portions 36d.

Figure 7:
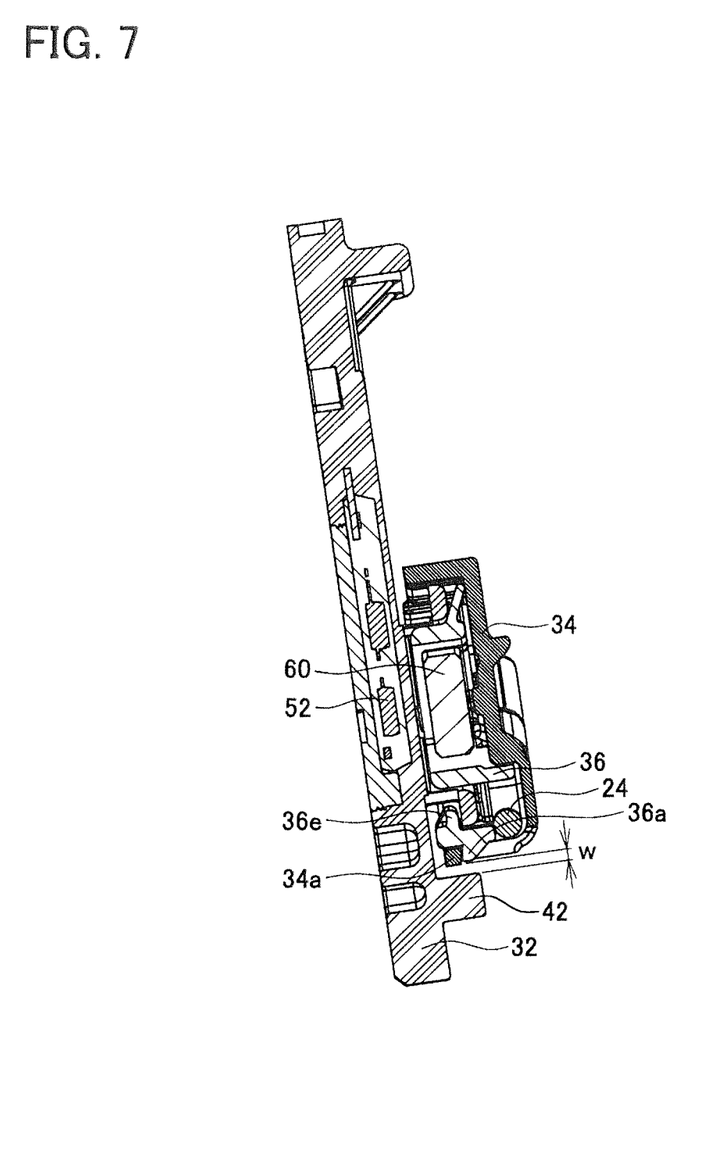
FIG. 7 is a cross-sectional view taken along a VII-VII cross-section of FIG. 2.

As shown in FIG. 7, the hook portion 36e protrudes from the engaging portion 36d toward a lower position than the guide rail 32a. The hook portion 36e is engaged with the guide rail 32a by a snap fit structure. The engagement of the hook portion 36e with the guide rail 32a prevents the holder 36 from coming off the guide rail 32a. This configuration makes it possible to easily attach the holder 36 to the guide rail 32a.

The hook portion 36a protrudes from the engaging portion 36d in a direction opposite to the hook portion 36e, i.e. toward outside of the holder 36. A clearance w between the hook portion 36a and the rotation regulating portion 42 is smaller than a thickness of an engaging portion 34a of the cover 34 that is described later. A clearance between the hook portion 36a and each of the rotation regulating portions 40, 44, and 46 is identical to the clearance w between the hook portion 36a and the rotation regulating portion 42.

Figure 6:
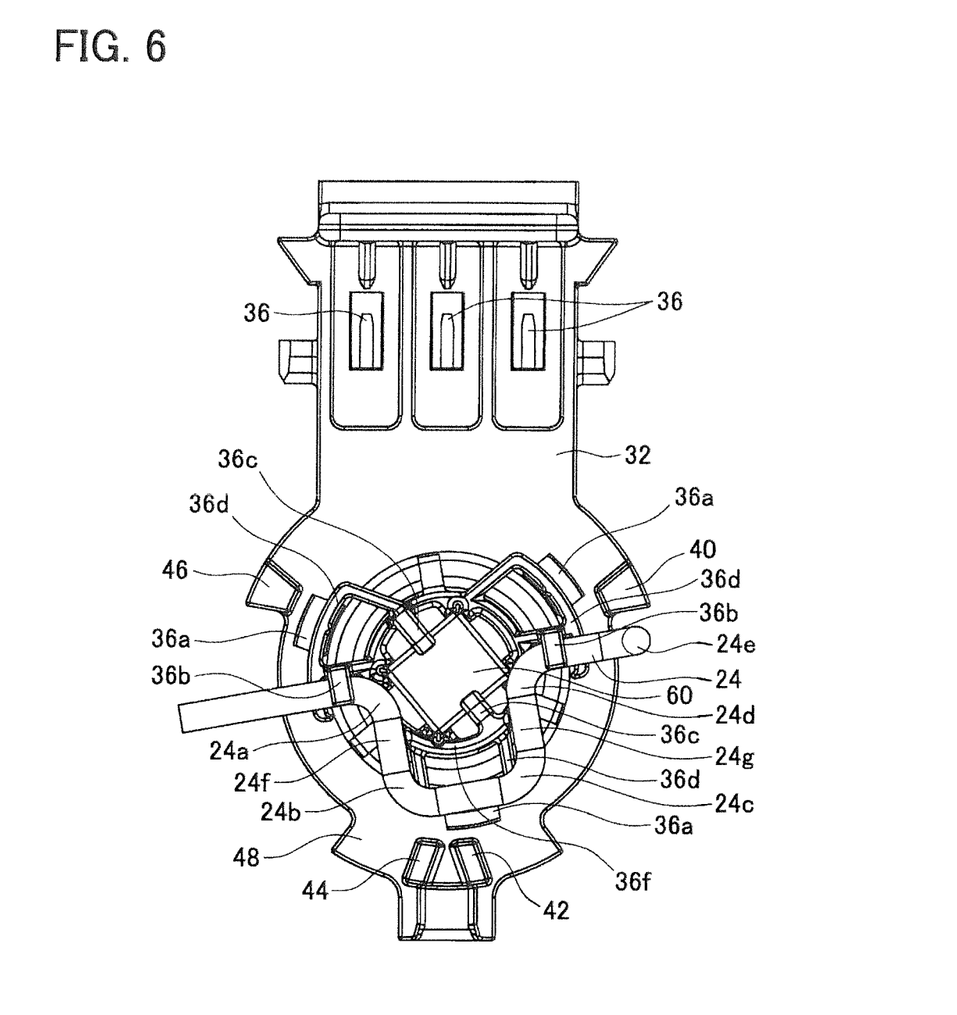
FIG. 6 shows how an arm is attached to a holder.

As shown in FIG. 6, two of the three engaging portions 36d are provided with the arm holding portions 36b, respectively. The two arm holding portions 36b are disposed with the center of the guide rail 32a interposed therebetween. Each of the arm holding portions 36b protrudes from the engaging portion 36d in a direction opposite to the body 32. Each of the arm holding portions 36b has a leading end bending at a right angle (see FIG. 4).

One of the arm holding portions 36b contacts a portion of the arm 24 located on a float 22 side from the bending point 24a from a side opposite to the body 32 and from the upper side of FIG. 6. The other of the arm holding portions 36b contacts a portion of the arm 24 that is farther from the float 22 than the bending point 24d from a side opposite to the body 32 and from the upper side of FIG. 6. With this, the movement of the arm 24 toward the upper side of FIG. 6 with respect to the holder 36 and the movement of the arm 24 in a direction away from the body 32 are regulated.

Further, the arm 24 contacts the engaging portions 36d on sides opposite to the arm holding portions 36b. With this, the movement of the arm 24 in a direction toward the body 32 is regulated.

The contact wall 36f is disposed between a straight-line portion 24f between the bending point 24a and the bending point 24b and a straight-line portion 24g between the bending point 24c and the bending point 24d. The contact wall 36f protrudes from the one of the engaging portions 36d which is not provided with the arm holding portion 36b, and has a partially circular arc shape extending along the circumference of the guide rail 32a. Between the straight-line portion 24f and the straight-line portion 24g, one end of the contact wall 36f contacts the straight-line portion 24f, and the other end of the contact wall 36f contacts the straight-line portion 24g. As a result of this, the movement of the arm 24 in an axial direction (particularly a direction of extension of the portion of the arm 24 located on a float 22 side from the bending point 24a) of the arm 24 is regulated by the contact wall 36f.

Figure 8:
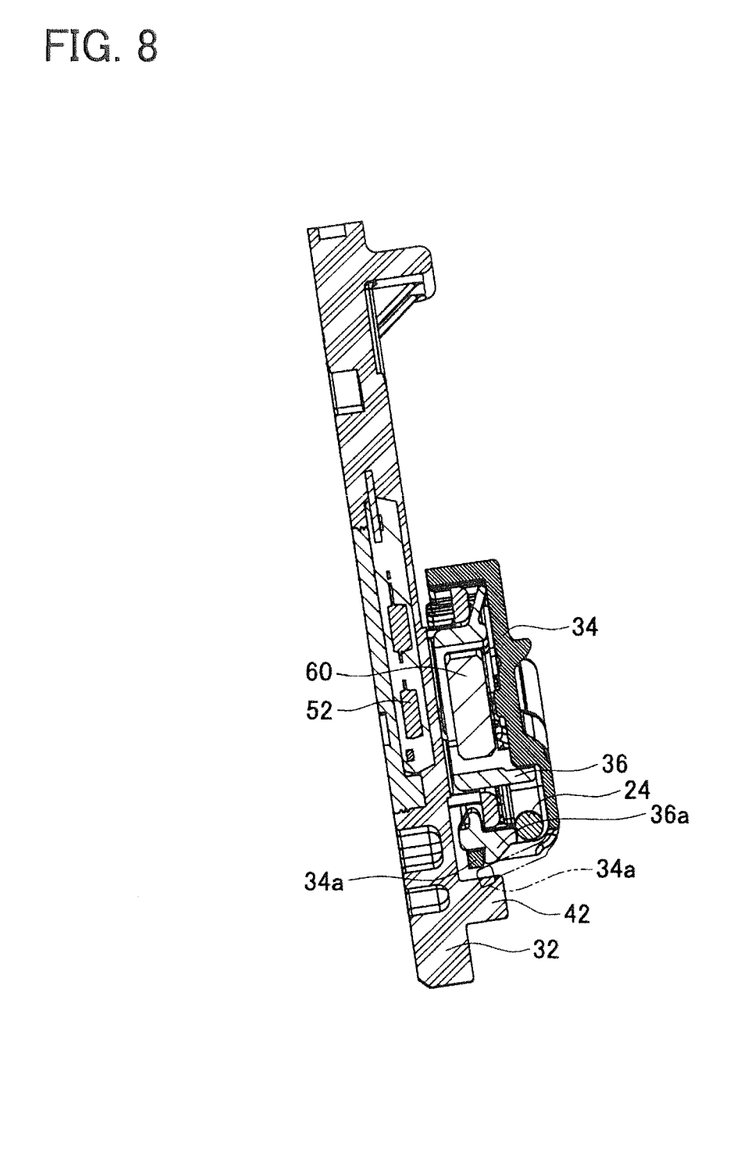
FIG. 8 is a diagram for explaining how an engaging portion is not engaging with a hook portion in the VII-VII cross-section of FIG. 2.

A surface of the holder 36 opposite to the body 32 is covered with the cover 34. As shown in FIG. 4, the cover 34 includes three engaging portions 34a, a rotation regulating portion 34b, and two notches 34c (see FIG. 3). Each of the engaging portions 34a is disposed at an end on a body 32 side of the cover 34. Each of the engaging portions 34a has a partially circular arc shape centered at the center of the guide rail 32a. As shown in FIG. 7, the engaging portion 34a is located on the body 32 side from the hook portion 36a. The engagement of the engaging portion 34a with the hook portion 36a prevents the cover 34 from coming off the holder 36. As indicated by an imaginary line in FIG. 8, when the cover 34 is attached to the holder 36, the cover 34 elastically deforms, whereby the engaging portion 34a passes through outside of the hook portion 36a and moves toward the body 32 side beyond the hook portion 36a. That is, the cover 34 and the holder 36 are connected to each other by a snap fit structure at the engaging portion 34a and the hook portion 36a. This makes it possible to easily attach the cover 34 to the holder 36.

As mentioned above, the clearance w between the hook portion 36a and each of the rotation regulating portions 40, 42, 44, and 46 is smaller than the thickness of the engaging portion 34a. For this reason, as indicated by the imaginary line in FIG. 8, the engaging portion 34a contacts the rotation regulating portions 40, 42, 44, and 46 in a case where the cover 34 and the holder 36 are not properly connected to each other and the engaging portion 34a is disposed outside of the hook portion 36a. This makes the arm 24 unable to smoothly rotate. This configuration makes it possible to detect an improper connection between the cover 34 and the holder 36.

As shown in FIGS. 3 and 4, the notches 34c are formed in a side wall of the cover 34. Each of the notches 34c has a width that is substantially equal to a diameter of the arm 24. When the cover 34 is attached to the holder 36, the arm 24 is disposed within the notches 34c. With this, the movement of the arm 24 in a direction perpendicular to the axial direction of the arm 24 is regulated in the rotation plane of the arm 24. As a result of this, the movement of the arm 24 in the rotation plane and a direction perpendicular to the rotation plane with respect to the cover 34 and the holder 36 is regulated by the cover 34 and the holder 36. As a result of this, the arm 24 is displaced with respect to the cover 34 and the holder 36, whereby the occurrence of a detection error can be suppressed.

As shown in FIG. 2, in a state where the cover 34 is attached to the holder 36, the rotation regulating portion 34b of the cover 34 is capable of contacting a contact face 40a of the rotation regulating portion 40 and a contact face 42a of the rotation regulating portion 42 when the arm 24 rotates in the direction of an arrow R. This regulates a range of rotation of the arm 24. It should be noted that changing the attachment positions of the cover 34, the holder 36, and the arm 24 with respect to the body 32 makes it possible to switch among the following four states (i) to (iv): (i) a state where the rotation regulating portion 34b is capable of contacting a contact face 40b of the rotation regulating portion 40 and a contact face 46b of the rotation regulating portion 46; (ii) a state where the rotation regulating portion 34b is capable of contacting a contact face 44a of the rotation regulating portion 44 and a contact face 46a of the rotation regulating portion 46; (iii) a state where the rotation regulating portion 34b is capable of contacting the contact face 40a of the rotation regulating portion 40 and the arm 24 is capable of contacting a contact face 48a of the rotation regulating portion 48; and (iv) a state where the rotation regulating portion 34b is capable of contacting the contact face 46a of the rotation regulating portion 46 and the arm 24 is capable of contacting the contact face 48b of the rotation regulating portion 48.

As shown in FIG. 7, the body 32 houses the magnetic sensor 52. The magnetic sensor 52 is disposed at the back (fuel pump unit 12 side) of the magnet 60. The body 32 is fixed to the magnetic sensor 52, and the arm 24, the cover 34, and the holder 36 are rotatable with respect to the magnetic sensor 52. For this reason, the magnet 60, which is fixed to the holder 36, is rotatable with respect to the magnetic sensor 52.

The magnetic sensor 52 detects a rotary motion of the arm 24. Based on a result of the detection, the magnetic sensor 52 outputs, to a fuel meter (not illustrated), a signal representing an analog quantity corresponding to the amount of the fuel stored in the fuel tank 4 (see FIG. 1). Examples of the signal representing the analog quantity include an analog voltage signal, a signal based on PWM (which stands for "pulse width modulation"), a signal that is sent by digital communication such as CAN (which stands for "controller area network") or LAN (which stands for "local area network"), etc. The magnetic sensor 52 is a magnetic sensor configured to detect a rotation angle of the arm 24, and a usable example of the magnetic sensor 52 is a publicly-known sensor using a Hall IC. Specifically, the magnetic sensor 52 has a Hall element configured to detect the orientation of a magnetic field of a magnet 26. The magnetic sensor 52 is covered with the body 32 so as not to be exposed to outside.

As shown in FIG. 2, the three lead wires 50 extend from the magnetic sensor 52. The three lead wires 50 are connected to a power supply line 52, an output line 54, and a ground line 56, respectively (see FIG. 1). The power supply line 52, the output line 54, and the ground line 56 are connected to the fuel meter through the set plate 6.

(Liquid Amount Detection Method)

Next, a liquid amount detection method is described. While the vehicle is being operated (i.e. while the engine is being driven), the magnetic sensor 52 outputs a signal corresponding to the orientation of a magnetic field of the magnet 60. When the height of the liquid level of the fuel in the fuel tank 4 changes, the float 22 moves in an up-and-down direction, and the arm 24 rotates in accordance with the movement of the float 22 in the up-and-down direction.

A rotation center of the arm 24 coincides with the center of the guide rail 32a. In the center of the guide rail 32a, the magnet 60 is housed. The center of the magnet 60 coincides with the rotation center of the arm 24. The magnet 60 is a permanent magnet. The magnet 60 axially rotates along with the rotation of the arm 24. As a result of this, the orientation of the magnetic field of the magnet 60 varies in accordance with the rotation of the arm 24, i.e. in accordance with the height of the liquid level of the fuel in the fuel tank 4. The magnetic sensor 52 detects a rotary motion of the arm 24. Based on a result of the detection, the magnetic sensor 52 outputs, to the fuel meter, a signal corresponding to the amount of the fuel stored in the fuel tank 4. Upon receiving the signal outputted from the magnetic sensor 52, an external CPU (not illustrated) determines the amount of the fuel stored in the fuel tank 4 and causes an indicator to indicate the fuel amount thus determined.

EFFECTS OF THE PRESENT EMBODIMENT

In a case where the liquid amount detector 20 is placed into the fuel tank 4 together with the fuel pump module 10, the fuel pump module 10 is inserted into the fuel tank 4 through the opening in the fuel tank 4. From a point of view of sealing properties, it is preferable that the opening in the fuel tank 4 be as small as it can be. For this reason, it is difficult to widen the opening in the fuel tank 4 for the purpose of placing the fuel pump module 10 into the fuel tank 4. A worker must place the fuel tank module 10 into the fuel tank 4 through the opening in the fuel tank 4, which is not wide.

In the liquid amount detector 20 described above, the arm holding portions 36b and the contact wall 36f, which are supporting members configured to support the arm 24, are prevented by the holder 36 and the cover 34 from being exposed to outside of the liquid amount detector 20. This makes it possible to, in inserting the fuel pump module 10 into the fuel tank 4 through the opening in the fuel tank 4, prevent the arm holding portions 36b and the contact wall 36f from making contact with the fuel tank 4. This makes it possible to restrain the arm 24 from coming off the supporting member 31.

Further, in the liquid amount detector 20 described above, the arm 24 is firmly held by the holder 36 and the cover 34 in a position between the holder 36 and the cover 34. For this reason, even if the arm 24 makes contact with the fuel tank 4 when the fuel pump module 10 is placed into the fuel tank 4, the arm 24 can be prevented from coming off the supporting member 31.

(Correspondence Relationship)

The liquid amount detector 20 described above is an example of the "liquid level detector". The axial direction of the arm 24 and the direction perpendicular to the axial direction of the arm 24 are an example of the "first direction" and an example of the "second direction", respectively. The bending point 24a, the bending point 24c, and the bending point 24b are an example of the "first bending point", an example of the "second bending point", and an example of the "third bending point", respectively. The arm holding portions 36b are an example of the "regulating portion".

Second Embodiment

Figure 9:
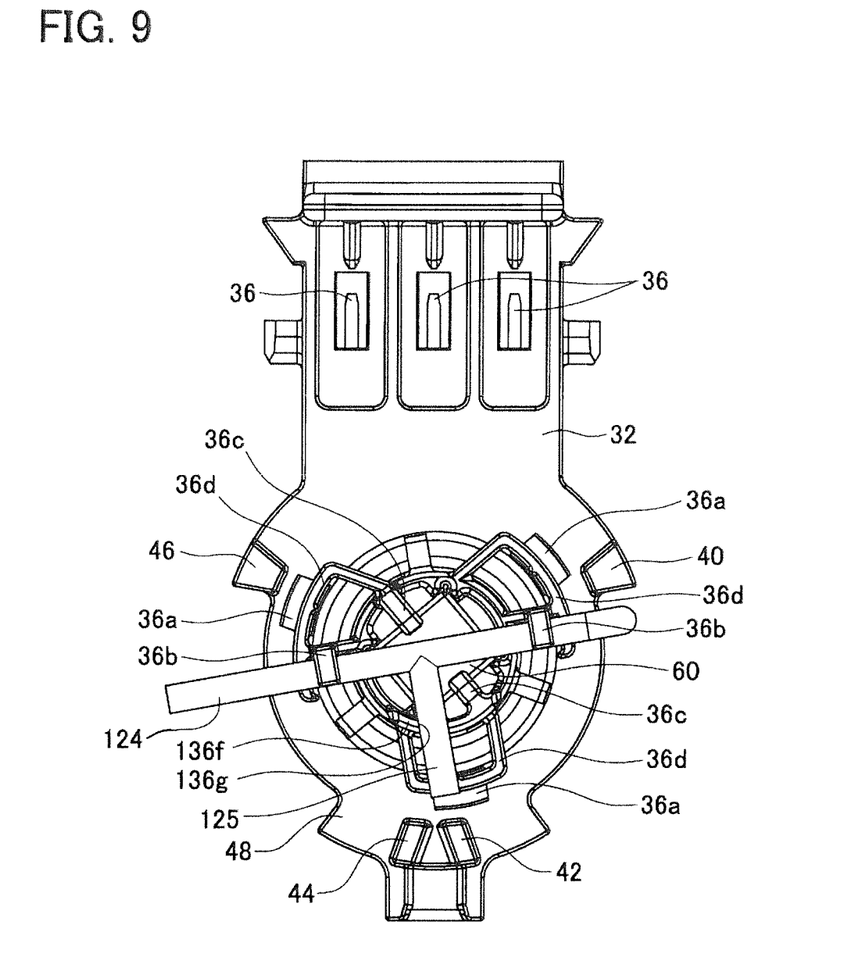
FIG. 9 shows how an arm is attached to a holder of a second embodiment.

Points of difference from the first embodiment are described with reference to FIG. 9. In the present embodiment, the shape of an arm 124 and the shape of a holder 136 are different from the shapes of the arm 24 and the holder 36 of the first embodiment. The holder 136 has a contact wall 136f that is similar to the contact wall 36f. The contact wall 136f has a notch 136g extending from a leading end of the contact wall 136f to the body 32 side. The notch 136g has a width that is substantially identical to a diameter of the arm 124. The other components of the holder 136 are the same as those of the holder 36.

The arm 124 includes a branch arm 125. The branch arm 125 branches off from a portion of the arm 124 between the two arm holding portions 36b. The branch arm 125 extends in a direction (which is an example of the "second direction") orthogonal to the direction (which is an example of the "first direction") in which the arm 124 extends. The branch arm 125 is disposed within the notch 136g in the contact wall 136f. With this configuration, the movement of the arm 124 along its axial direction is regulated by the contact of the branch arm 125 with the notch 136g.

In the embodiment described above, the arm 24 bends at right angles at the four bending points 24a to 24d. However, the number of bending points of the arm 24 may be three or less or may be five or more. For example, the arm 24 may have only two bending points 24a and 24b. In this case, the arm 24 may bend at 60° at the bending point 24a and, furthermore, may bend at 60° at the bending point 24b. In this case, the holder 36 may have a contact portion (e.g. a triangular prismatic contact portion) located between a straight-line portion between the bending points 24a and 24b and a straight-line portion located on an opposite side of the float 22 from the bending point 24b and contacting both of the straight-line portions. With this configuration, too, the movement of the arm 124 along its axial direction is regulated. Alternatively, for example, the arm 24 may have only one bending point 24a, and a portion of the arm 24 located on an opposite side of the float 22 from the bending point 24a may be bent into an at least partially circular arc shape.

Further, the "liquid level detector" of the present specification may be a detector configured to detect an amount of liquid in a container such as an amount of water stored in a water storage tank, other than the fuel amount detector 20 configured to detect the amount of the fuel in the fuel tank 4.

Further, in the embodiment described above, the magnetic sensor 52 outputs, to the fuel meter, a signal concerning an analog quantity corresponding to the amount of the fuel stored in the fuel tank 4. However, the magnetic sensor 52 may detect a rotary motion of the arm 24 and, based on a result of the detection, output, to the fuel meter, a signal corresponding to the height of the liquid level of the fuel stored in the fuel tank 4. In this case, upon receiving the signal outputted from the magnetic sensor 52, the external CPU may determine the height of the liquid level of the fuel stored in the fuel tank 4 and cause the indicator to indicate the height of the liquid level thus determined.

What is claimed is:
1. A liquid level detector comprising:
   a float;
   an arm attached to the float and configured to convert a linear motion of the float in an up-and-down direction to a rotary motion;
   a sensor configured to detect the rotary motion; and
   a supporting member supporting the arm to be rotatable relative to the sensor,
   wherein the supporting member comprises:
      a body fixed to the sensor;
      a holder rotatably attached to the body; and
      a cover arranged on an opposite side from the body with the holder intervened in between, and covering the holder from the opposite side,
   the arm is supported by the supporting member between the holder and the cover,
   the holder comprises a first hook portion protruding toward outside of the holder,
   the cover comprises a cover side engaging portion engaging with the first hook portion,
   the holder and the cover are connected to each other by engaging the cover side engaging portion with the first hook portion while the cover side engaging portion is located on a body side than the first hook portion.
2. The liquid level detector as in claim 1, wherein the holder and the cover are connected to each other by a snap fit structure.
3. The liquid level detector as in claim 1, wherein the arm extends between the holder and the cover at least in a first direction and a second direction being different from the first direction, and
at least one of the holder and the cover contacts a portion of the arm extending in the second direction.
4. The liquid level detector as in claim 3, wherein the arm bends at least at a first bending point and a second bending point between the holder and the cover,
the first bending point is located on a float side from the second bending point,
a portion of the arm located on the float side from the first bending point extends in the first direction,
a portion of the arm located on an opposite side of the float side from the first bending point extends in the second direction, and
at least one of the holder and the cover contacts a portion of the arm located between the first bending point and the second bending point, and a portion of the arm located on the opposite side of the float side from the second bending point of the arm.
5. The liquid level detector as in claim 4, wherein the arm bends at a third bending point located between the first bending point and the second bending point,
the arm bends on a rotation plane of the arm at the first bending point, the second bending point, and the third bending point respectively,
a portion of the arm located between the first bending point and the third bending point and the portion of the arm located on the opposite side of the float side from the second bending point of the arm extend in the rotation plane toward the same direction with a space between each other, and
the holder is disposed between the portion located between the first bending point and the third bending point of the arm and the portion located on the opposite side of the float from the second bending point of the arm, and
the holder contacts the portion located between the first bending point and the third bending point of the arm and the portion located on the opposite side of the float from the second bending point of the arm.
6. The liquid level detector as in claim 1, wherein the holder comprises a regulator configured to regulate the arm to move in a direction orthogonal to a rotation plane of the arm.
7. The liquid level detector as in claim 1, wherein the body comprises a rotation regulating portion configured to regulate a rotation of the arm and disposed at an outer peripheral end of the cover with an interval provided between the rotation regulating portion and the outer peripheral end of the cover, the cover side engaging portion and the rotation regulating portion are disposed with an interval between each other in a state where the first hook portion and the rotation regulating portion oppose each other and the cover side engaging portion is engaged with the first hook portion, and a clearance between the first hook portion and the rotation regulating portion is smaller than a thickness of the first hook portion in a state where the first hook portion and the rotation regulating portion oppose each other.

8. The liquid level detector as in claim 1, further comprising:

a magnet retained by the holder and disposed to be rotatable with respect to the sensor, wherein the sensor detects the rotary motion of the arm by detecting a direction of a magnetic field of the magnet.

9. The liquid level detector as in claim 1, wherein the cover comprises a notch having a width that is substantially equal to a diameter of the arm, a part of the arm is disposed within the notch, and the notch regulates a movement of the arm in a direction perpendicular to an axial direction of the arm in a rotation plane of the arm.

10. The liquid level detector as in claim 1, wherein the body comprises a guide rail protruding from a surface of the body and having an annular shape, the holder comprises:

a holder side engaging portion extending from an inner peripheral side of the guide rail beyond an outer peripheral end of the guide rail, and toward the body along an outer side of the outer peripheral end of the guide rail; and a second hook portion protruding from the holder side engaging portion toward a lower position than the guide rail, the holder is rotatably attached to the guide rail by engaging the second hook portion to the guide rail.

11. A liquid level detector comprising:

a float;

an arm attached to the float and configured to convert a linear motion of the float in an up-and-down direction to a rotary motion;

a sensor configured to detect the rotary motion; and a supporting member supporting the arm to be rotatable relative to the sensor, wherein the supporting member comprises:

a body fixed to the sensor;

a holder rotatably attached to the body; and a cover arranged on an opposite side from the body with the holder intervened in between, and covering the holder from the opposite side, the arm is supported by the supporting member between the holder and the cover, the arm bends at least at a first bending point, a second bending point and a third bending point between the holder and the cover, the first bending point is located on a float side from the second bending point, the third bending point is located between the first bending point and the second bending point, the arm bends on a rotation plane of the arm at the first bending point, the second bending point, and the third bending point respectively, a portion of the arm located on the float side from the first bending point extends in a first direction, a portion of the arm located on an opposite side of the float side from the first bending point extends in a second direction being different from the first direction, and a portion of the arm located between the first bending point and the third bending point and a portion of the arm located on the opposite side of the float side from the second bending point of the arm extend in the rotation plane toward the second direction with a space between each other, and the holder is disposed between the portion located between the first bending point and the third bending point of the arm and the portion located on the opposite side of the float from the second bending point of the arm, and the holder contacts the portion located between the first bending point and the third bending point of the arm and the portion located on the opposite side of the float from the second bending point of the arm.

* * * * *